TELEPHONE SWITCHING MATRIX WITH PHOTO-RESPONSIVE SWITCHING ELEMENTS

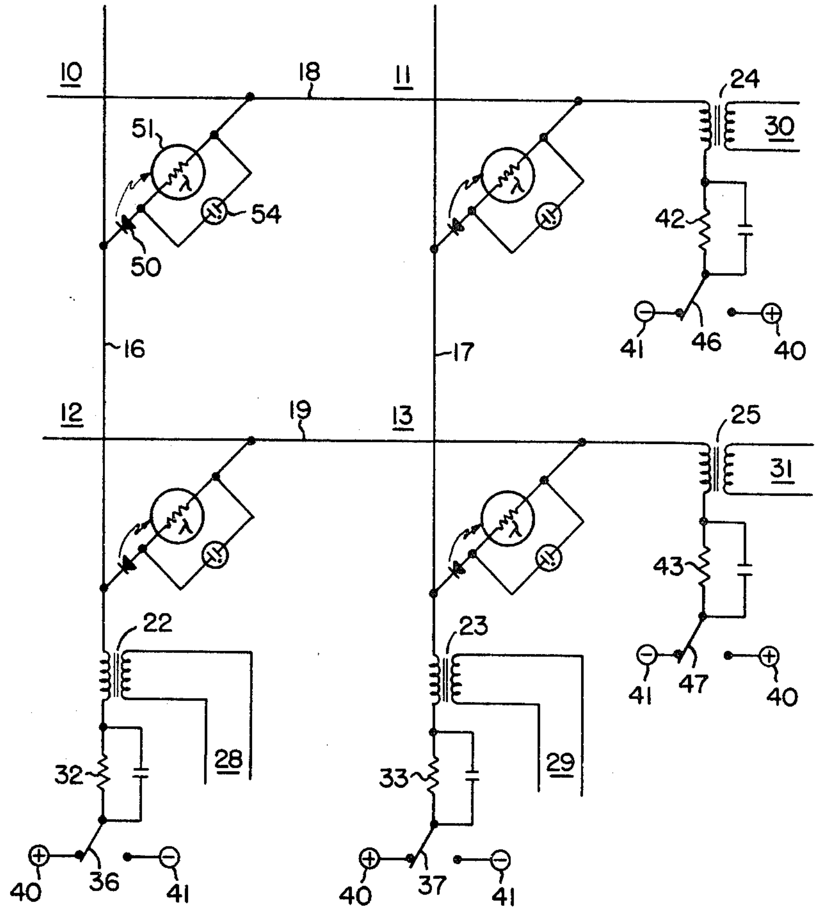
INVENTOR
BARRIE BRIGHTMAN
BY [signature]
ATTORNEY 3,499,122

Barrie Brightman, Webster, N.Y., assignor to Stromberg-Carlson Corporation, Rochester, N.Y., a corporation of Delaware Filed July 6, 1967, Ser. No. 651,567
Int. Cl. H04m 3/22
U.S. Cl. 179—18 2 Claims

ABSTRACT OF THE DISCLOSURE

A coordinate matrix defining switching crosspoints including a light emitting diode electrically in series with and optically coupled to a photoconductor at each crosspoint. A threshold type conductive element such as a neon tube shunts the photoconductor to initiate conduction through the diode. Once the diode starts conducting, the resulting reduction in resistance of the photoconductor lowers the voltage drop across it and extinguishes the neon tube. The crosspoint remains self-holding so long as current is continued through it. The column and row leads that are connected at an ON crosspoint are held at a potential mid-way between the potentials of the two battery terminals so that only half of the battery voltage can be applied at other crosspoints along the two leads, and only one connection can be made at a time to any one lead.

BRIEF SUMMARY OF THE INVENTION

This invention relates to a novel coordinate crosspoint switching matrix for use in electronic telephone exchanges or the like, and, more particularly, to a crosspoint matrix of the stated type including an optically coupled self-holding switching combination at each crosspoint.

Briefly, a switching matrix according to the invention includes an array of cross conductors defining crosspoints, with a switching circuit at each crosspoint for effecting a low impedance connection between the two conductors that cross there. Each switching circuit includes a light emitting diode in series with a photoconductor, and a threshold device such as a neon tube shunting the photoconductor. The control equipment is arranged to connect one terminal of the exchange battery to a column conductor and the opposite terminal to a row conductor of the matrix through separate resistors to effect a connection at a selected crosspoint.

Normally, when there is no connection at a particular crosspoint, and no connection has been made to either one of the conductors that cross there, the full battery voltage appears across the diode in its back direction, and no current flows at the crosspoint. To effect a connection at the crosspoint, the battery connections to the two conductors are reversed to apply the full battery voltage across the switching circuit in the forward direction for the diode. The neon tube fires, turning ON the light emitting diode, which illuminates the photoconductor to turn the neon tube OFF, and establishes the self-holding connection at the crosspoint. If either one of the matrix conductors at the selected crosspoint is already in use, that is, already connected to a crossing conductor at a different crosspoint, it is held at about the midpotential of the battery, so that only one-half of the total battery voltage is applied across the switching circuit and it does not fire. The neon tube serves only to trigger the crosspoint switching circuit ON, and conducts only for a very short period each time the crosspoint is turned ON. The disadvantages of maintaining the neon tube in series with the voice signal transmission circuit are avoided.

DETAILED DESCRIPTION

A presently preferred embodiment of the invention will now be described in connection with the accompanying drawing, wherein the single figure is a schematic circuit diagram of an abbreviated crosspoint matrix illustrating the principles of the invention.

Typically, a matrix according to the invention would comprise from one hundred to several hundred crosspoints, but the principles may be fully understood by reference to the smaller matrix illustrated, which includes only four crosspoints 10, 11, 12, and 13, respectively, each defined by the intersection of one of the column leads 16 and 17 and one of the row leads 18 and 19. The leads 16–19 are open at one end, and are connected at their opposite ends through respective transformers 22, 23, 24, and 25, respectively, to subscriber's lines 28 and 29, or to on-going lines 30 and 31 in the exchange. As shown, the column leads 16 and 17 are each connected through one winding of their respective transformers 22 and 23, current limiting resistors 32 and 33, respectively, and double throw contacts 36 and 37, respectively, of line relays (not shown) to the positive terminal 40 of the battery of the local exchange. Similarly, in complementary fashion, the row leads 18 and 19 are connected through their respective transformers 24 and 25, respective limiting resistors 42 and 43, respectively, and respective relay contacts 46 and 47 to the negative battery terminal 41.

The switching arrangement at each of the crosspoints 10–13 includes a light emitting diode 50 connected in series with a photoconductor 51 between a column conductor 16 or 17 and a row conductor 18 or 19, with the diode oriented to conduct in the direction from the row conductor to the column conductor. Additionally, a threshold device such as the neon tube 54 shown is connected in shunt across the photoconductor 51. The neon tube 54 is presently thought to be the preferred type of threshold device primarily because of its extremely low cost.

In the idle, or so-called normal condition, as shown, the exchange battery is applied across each of the crosspoints 10–13 in the back direction relative to the orientation of the light emitting diodes 50, thus keeping each of the crosspoints 10–13 in a positively locked OFF condition, and there is no significant current flow in the matrix.

When a connection is to be established at a selected crosspoint, say, for example, the first crosspoint 10, the battery connections for the two leads 16 and 18 that cross at the selected crosspoint are reversed by actuation of the relays which control the contacts 36 and 46, and the full battery voltage is applied at the selected crosspoint 10 in the forward direction for the light emitting diode 50. The neon tubes 54 are selected to have threshold values greater than half the battery voltage and less than the full battery voltage. With the full voltage applied in the forward direction for the diode 50, the neon tube 54 fires permitting current to flow through the light emitting diode 50, which thereupon generates light. Light from the light emitting diode 50 reduces the resistance of the photoconductor 51 to a fairly low value, typically less than 10 ohms, and the voltage drop across the photoconductor 51 becomes too small to sustain the neon tube 54, which thereupon ceases to conduct and turns OFF. The light emitting diode-photoconductor combination remains conducting so long as the battery connection is continued with the same polarity. It returns to its non-conductive, or OFF condition as soon as either one of the relay contacts 36 and 46 returns to its normal left-hand position.

Once one of the crosspoints is turned ON, there is only a small voltage drop across the light emitting diode-photoconductor circuit there, and due to the voltage dividing effect of the series resistors 32 and 42, both of the leads that cross at the crosspoint are held at a potential close to the mid-point between the potentials of the two battery terminals 40 and 41. This action prevents dual seizure of any one of the leads 16–19. Assume, for example, that the first crosspoint 10 is in an ON condition, the left-hand column lead 16 and the upper row lead 18 are then at potentials very close to each other and approximately at the mid-point between the potentials of the two battery terminals 40 and 41. If, under these circumstances, another crosspoint, say, for example, the fourth crosspoint 13 at the lower right-hand corner of the matrix, as shown, is to be turned on, its row lead 19 will be switched from the negative battery terminal 41 to the positive terminal 40, but this will not turn ON the third crosspoint 12, which is along the same row lead 19. The third crosspoint 12 is in the same column with the first crosspoint 10 which is already ON and only one half of the battery voltage is applied to the third crosspoint switching circuit. The full battery voltage, however, is applied to the fourth crosspoint 13, and it will turn ON as soon as the neon tube there fires.

What is claimed is:

1. A crosspoint switching array comprising plural row and column leads arranged in a coordinate array to define crosspoints, plural switching circuit portions, one at each of said crosspoints, for selectively and alternately closing and opening electrical connections between said row leads and said column leads, each of said switching circuit portions including a light emitting diode and a photoconductor optically coupled to each other and electrically in series between one of said row leads and one of said column leads, and an electrical threshold device shunting said photoconductor, means for normally connecting a source of direct current between said row and said column leads to apply a voltage in the back direction across said diodes, and selection means for selectively reversing the polarity of the voltage applied between a selected one of said row leads and a selected one of said column leads.

2. A crosspoint switching array according to claim 1 wherein said threshold device is a neon tube having a threshold characteristic greater than one-half the voltage of the direct current source and less than the whole voltage.

References Cited

UNITED STATES PATENTS 3,349,187 10/1967 Bray et al. ---------- 179—18
3,406,262 10/1968 Grandstaff ---------- 179—84

KATHLEEN H. CLAFFY, Primary Examiner

WILLIAM A. HELVESTINE, Assistant Examiner